United States Patent Office.

HENRY LAKE, OF SAN FRANCISCO, CALIFORNIA.

Letters Patent No. 73,730, dated January 28, 1868.

IMPROVED JAPAN PASTE-BLACKING.

*The Schedule referred to in these Letters Patent and making part of the same.*

TO WHOM THESE PRESENTS SHALL COME:

Be it known that I, HENRY LAKE, of the city and county of San Francisco, State of California, have made a new and superior article of blacking, that I designate Japan Paste-Blacking, for which I desire to secure Letters Patent. The following description and specification of the ingredients used will enable any one skilled in compounding ingredients to make the article and produce the results claimed.

The purposes of my invention are to produce a new combination of materials to make a superior article of blacking for boots and shoes, or other articles made of leather.

The following are the ingredients of which it is composed, samples of which are forwarded for deposit in the Patent Office, and the quantities designated, with description for compounding, they being named and numbered, and all necessary references specified, with mode of preparation and use, the amount of the ingredients named producing a sufficient quantity to fill one gross of boxes such as is deposited with the ingredients.

*Ingredients.*

No. 1. Ivory-black, fourteen pounds.
    2. Molasses, eight pounds.
    { 3. Alum, one-quarter pound.
    { 3. Water, two and one-half pounds.
    { 4. Indigo-blue, one-quarter pound.
    { 4. Water, two and a half pounds.
    { 5. Soda, (common,) one-quarter pound.
    { 5. Water, two and a half pounds.
    6. Vinegar, (cider,) eight pounds.
    7. Sulphuric acid, five pounds.
    8. Polar oil, four pounds.

*Mode of Compounding.*

Nos. 1 and 2 to be compounded together; Nos. 3 and 3, separately, also 4 and 4, and 5 and 5; then mix 3, 4, and 5 together, and compound with 1 and 2, mixing them thoroughly together; after which put in No. 6, mix well, then introduce No. 7, and stir till it stops boiling or being agitated; then add No. 8 to the mixture, and stir till cold; then it may be set away for a day, and then ground thoroughly in a mill, when it is ready for boxing and use.

This blacking retains its moisture, and improves with age. It will not mould or injure from dampness or exposure. It is susceptible of producing a superior gloss, and a perfect jet black, and is also a dressing to the finest leather, filling the pores, and softening it by the ingredients in the compound; and when the polish is produced, it will not soil the purest white, not even in a moist or damp atmosphere. This composition will not only be a jet black, but it retains its lustre for a longer period than any similar compound known, and is not injured by any temperature or climate.

The box marked Lake & Co., Japan Paste-Blacking, is the article as compounded and sold, and only requires testing to satisfy the most skeptical. To give it a perfect test, the leather should receive a second polishing, the first to remove all deleterious substances, and to form a foundation for the action of the blacking, free to show its superiority, as represented.

*Claim.*

I claim the making of a superior article that I call the Japan Paste-Blacking, of the commodities specified, and substantially as set forth.

HENRY LAKE.

Witnesses:
    J. H. ATKINSON,
    H. F. RICHTER.